Patented Feb. 10, 1931

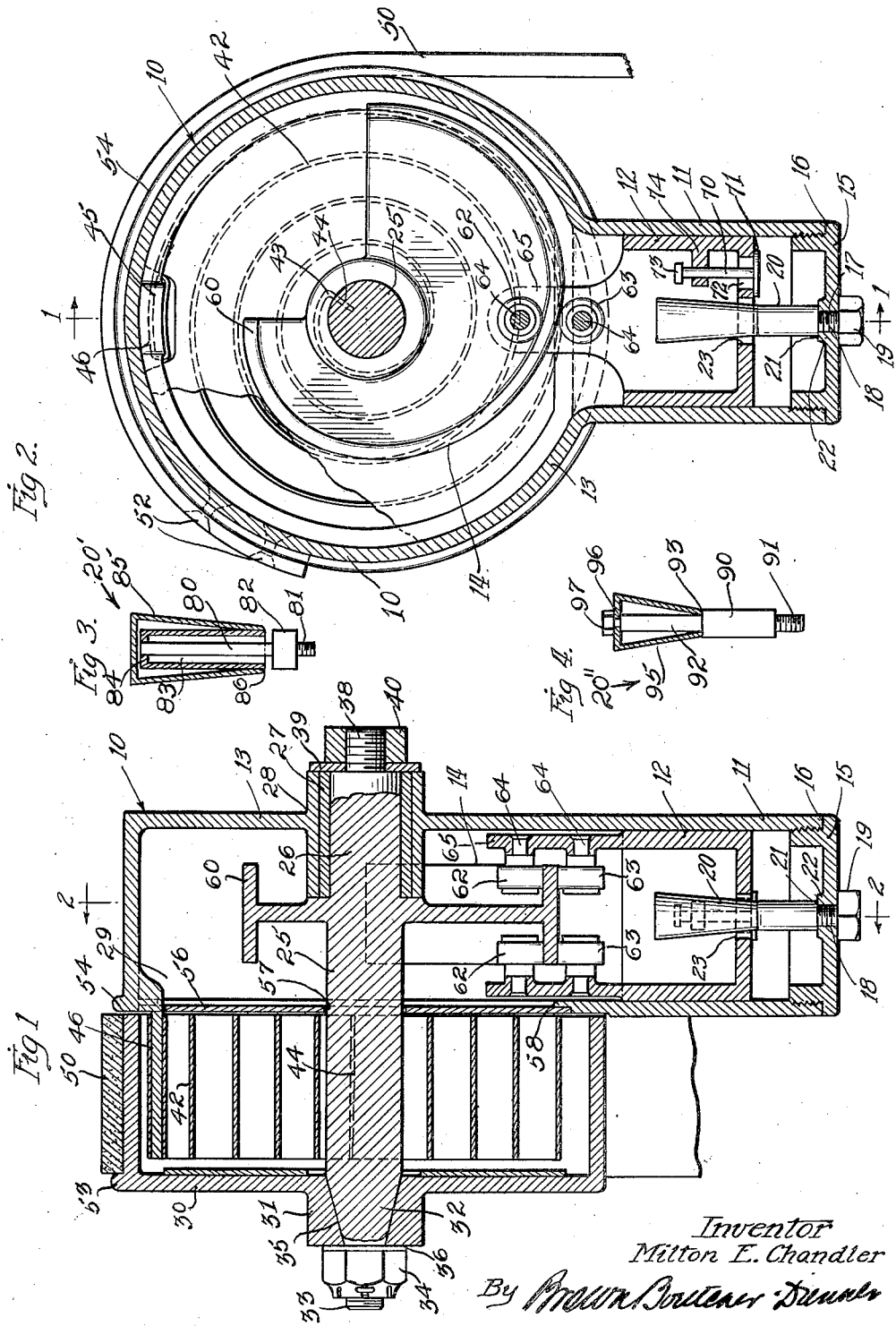

1,792,459

UNITED STATES PATENT OFFICE

MILTON E. CHANDLER, OF CHICAGO, ILLINOIS, ASSIGNOR TO STROMBERG RESEARCH CORPORATION, OF SOUTH BEND, INDIANA, A CORPORATION OF ILLINOIS

SHOCK ABSORBER

Application filed May 9, 1927. Serial No. 189,820.

My present invention relates to controllers for vehicle springs or the like and more particularly to shock absorbers of the same general character as that disclosed in the copending patent application of Frank C. Mock, Serial No. 730,806, filed August 8th, 1924.

It is well known that in order to secure proper riding of a vehicle that the spring or springs should be as free of friction or other resistance as possible for flexing thereof as the body and axle approach each other and should encounter a graduated resistance to recoil from maximum spring deflection back to normal or neutral position. Moreover further separation of the spring and axle should be free to occur in order to permit the vehicle to drop into a hole or the like without dragging the body down with it.

In accordance with the general features of my present invention I provide a novel controller which employs as a resistance a body of confined fluid and an orifice of varying size through which the fluid escapes. Also in this controller the pressure or resistance afforded is a function of the square of the velocity of movement through the orifice so that the control exerted by the resistance may be termed a velocity control.

Now in practice I find that changes in temperature vary the viscosity of the resistance fluid which is usually oil. Obviously this change in the viscosity of the oil affects its velocity through the control orifice of the controller. This is undesirable for the reason that it may cause the controller to be too stiff in winter or on the other hand it may result in its being too flexible in the summer months.

The object of my present invention is to provide means for compensating for the changes in the viscosity of the oil.

I propose to provide means responsive to temperature changes for varying the size of the control orifice of the controller through which the liquid is forced. This means functions to increase the size of the orifice with a drop in temperature and to decrease the size of the orifice when the temperature increases. In other words the size of the control orifice is proportional to the viscosity of the resistance fluid or oil.

My novel compensating means may take the form of a plug having a high temperature co-efficient of expansion and extending into an opening of a substantially fixed size.

This means may also take the form of a metallic member having an orifice and being composed of a metal having a relatively high temperature of co-efficient. This orifice is variable in size and is designed to receive a tapered plug. The plug is preferably made of a metal having a low temperature co-efficient of expansion, such for example as invar.

Now I desire it understood that although I have illustrated my invention as applied to a relatively simple form or type of shock absorber the invention is not to be thus limited for obviously it could be used in connection with other types of shock absorbers or controllers, such for example as those disclosed in the previously mentioned copending patent application.

Other objects and advantages of my present invention will more fully appear from the following detailed description taken in connection with the accompanying drawing which illustrates several embodiments thereof and in which:

Figure 1 is a fragmentary sectional view taken on substantially the line 1—1 of Figure 2;

Figure 2 is a sectional view taken on substantially the line 2—2 of Figure 1, looking in the direction indicated by the arrows;

Figure 3 is a sectional view illustrating one form of my novel control plug; and Figure 4 is a sectional view illustrating another form of this plug.

Referring now to the drawing in detail in which like reference numerals designates similar parts throughout the several views 10 denotes generally a metallic housing which may be suitably attached to the body of the motor vehicle directly over one of its springs. The housing 10 comprises a cylindrical portion 11 for receiving a piston 12 and an annular portion 13 in which is disposed a cam 14. The lower portion of the cylinder 11 has threaded therein a removable ring-like plug 15 which has an annular flange 16 abutting the lower edge of the cylinder 11. The member 15 has a centrally disposed threaded opening 17 adapted to have threaded therein the reduced end 18 of a tapered plug 20 which will be described more in full hereinafter. The reduced end 18 of the plug 20 extends clear through the member 15 and has threaded on its exterior portion a nut 19 which firmly clamps the plug 20 to the member 15. It will be noted that plug 20 has a shoulder portion 21 which abuts a boss 22 formed integral with the member 15. Plug 20 is disposed in a vertical position and extends through an opening 23 disposed substantially centrally of the piston 12. I shall describe this construction more in detail hereinafter.

Connected to the cam 14 is a shaft 25 journaled at one end 26 in a bushing or bearing 27, mounted in the hub portion 28 formed integral with the upper part 13 of housing 10. Now although I have illustrated the cam 14 as being integral with the shaft 25 it is of course to be understood that these parts may comprise separate units suitably secured together.

One side of the upper part 13 of housing 10 is provided with an opening 29 which communicates with the interior of an auxiliary casing 30, suitably connected to casing 10. Casing 30 has formed integral therewith a substantially central hub portion 31 in which the other end 32 of shaft 25 is journaled. The end 32 of shaft 25 has an externally threaded portion 33 positioned on the exterior of the hub 31. Threaded on to this portion 33 is a castellated nut 34 which serves to hold the tapered end 32 of shaft 25 in engagement with the bearing surface 35 of the hub 31. A lock washer 36 may be disposed between the nut 34 and the hub 31. Also shaft 25 is splined to hub 31.

The other end 26 of shaft 25 has formed integral therewith an externally threaded portion 38 which projects outside of the hub 28. A washer 39 is mounted on this threaded portion 38 and a lock nut 40 is threaded on portion 38. This nut 40 holds the washer 38 in tight engagement with the external edge of the hub 28.

Positioned within the casing 30 is a spiral coil spring 42, one end 43 of which is anchored at 44 to shaft 25. The other end 45 is suitably fastened to a lug 46 formed integral with the upper part of casing 10 and extending into the interior of casing 30 as shown in Fig. 1.

Now although the casing 30 is connected to the casing 10 through the shaft 25 it is of course evident that this casing 30 is adapted to revolve with the shaft 25 when the flexible strap 50 is initially actuated. The upper end of this strap 50 is anchored to the casing 10 by means of a pair of rivets 52. This upper end of the strap 50 encircles the upper portion of the periphery of the annular casing 30 and is disposed between an annular rib 53 formed integral with the edge of the casing 30 and the annular rib 54 formed integral with the upper part 13 of casing 10. These ribs are clearly shown in Fig. 1 and function to properly guide the strap 50 in its movement.

The interior of casing 30 is separated from the interior of the upper part 13 of casing 10 by means of an annular partition wall 56 having an opening 57 through which the shaft 25 extends. The periphery of this partition 56 abuts an annular flange 58 formed integral with casing 10. This partition 56 may be suitably anchored to the flange 58 if it is so desired. The function of the partition is to prevent the oil in the casing 10 from getting to the spring 42 and from leaking out of the casing 30.

The periphery of cam 14 is formed with a relatively wide flange 60 which is engaged on both its inner and outer surfaces by the rollers 62—62 and 63—63. Each of these rollers is rotatably mounted upon a small pin 64 anchored in the wall of the piston 12. In Fig. 2, it will be observed that the upper wall of the piston is reduced providing a pair of diametrically opposed ears 65 to which the pins 64 are secured. Now from the foregoing it will be evident that when the strap 50 is pulled downwardly the drum or casing 30 is revolved. This drum or casing is splined to the end of the shaft 25 by a key and thus causes the shaft 25 to rotate therewith. The shaft 25 in turning stores up energy in the spring 42 and also actuates the piston 12 through the means of the cam 14. As the strap returns to its normal position the coil spring and cam function to return the piston 12 to its normal position.

Disposed adjacent to the opening 23 in the piston 12 is a check valve designated generally by the reference character 70. This valve 70 has a head portion 71 adapted to cover an opening 72 in the bottom of the piston 12. The shank of the valve 70 is guided by means of a lug 74 formed integral with the inside wall of the piston 12. This lug has an opening through which the shank of the valve 70 extends. The upper end of the valve shank is provided with an enlarged portion 73 adapted to abut the lug 74 when the opening 71 is uncovered. This valve 70 is adapted to function on the up stroke of the piston 12 to release the oil or resistance fluid trapped above the piston. Moreover this valve is adapted to permit of the separation of the spring and axle with which the shock absorber is associated when the vehicle drops into a hole or the like.

Now the plug 20 shown in Fig. 2 is preferably made of a metallic substance having a relatively low temperature coefficient of expansion. Excellent results may be obtained by making it of invar. The piston 12 on the other hand is made of a metallic material having a relatively high temperature coefficient of expansion such for example as aluminum. By using such a construction it will be found that as the temperature varies the size of the opening 23 in the piston 12 will also vary. Also it will be observed that the plug 20 is preferably tapered at its upper end so as to cause the flow of liquid through the orifice or opening 23 to gradually diminish as the piston 12 is raised by the cam 14.

The operation of my shock absorber is briefly as follows: Now when the vehicle passes over a bump or raised portion in the road the axle moves toward the spring causing the strap 50 to become slack. This slackness in the strap 50 is taken up by the spring 42 which functions to draw it taut. The frame when it rises under the influence of the vehicle spring causes the shaft 25 and the cam 14 to turn. The cam 14 moves in a clockwise direction and causes the piston 12 to move downward. During this movement of the piston the check valve 70 remains closed and the liquid in the lower part of the housing 11 is forced upwardly thru the opening 23 into the piston 12.

When the axle begins to separate from the frame the piston 12 also begins to descend. During this downward stroke of the piston 12 the check valve is automatically forced shut thus resulting in the liquid having to pass through the opening 23. This opening gradually increases as the taper on the plug 20 decreases. In other words as the piston 12 moves downwardly the size of the opening 23 increases and hence less resistance is offered to the fluid being by-passed.

Furthermore it will be noted that on the upward stroke of the piston the check valve 70 is forced open by the liquid on top of the piston 12. This trapped liquid escapes through both the openings 23 and 72 when the piston 12 is moving upward. Since the check valve 70 is open during the entire upward stroke of the piston 12 the varying size of the opening 23 will not appreciably affect the escape of the trapped liquid.

During the downward stroke of the piston relatively high resistance is initially offered to the movement of the piston but this resistance gradually decreases as the piston is moved down. Obviously the back pressure or resistance afforded is a function of the square of the velocity of movement of the liquid through the orifice so that the control exerted by the resistance of the liquid may be termed a velocity control. The resistance which the opening 23 affords is of a character which will present over the short distance and the short range herein considered, substantially a uniform or limiting velocity of return of the piston 12 until the frame has nearly reached its normal position with respect to the axle.

As the axle and frame of the vehicle separate to the position corresponding to normal or loaded position the check valve 70 is automatically opened by the escaping oil. This results in the piston being substantially freed of the resistance of the liquid. The importance of this feature is that it permits the axle to drop down freely when the wheels of the vehicle run into a hole or encounter a depression or decline in the road bed. Moreover the movement of the axle below normal position with respect to the frame is permitted freely resulting in the spring suspension of the vehicle being able to take up depressions in the road bed with much less jarring or abrupt motion of the body than is possible where resistance of any kind is interposed as the spring moves below its normal or neutral position.

In practice I have found that the flow of the oil through the orifice 23 varies with the temperature due to the change in viscosity of the oil. These changes in the viscosity of the oil or resistance fluid affect its velocity through the control orifice 23 of the controller. In winter this change may become great enough to cause the controller to be stiff whereas on the other hand in the summer months it may result in the controller being too flexible. Therefore it becomes important that means be provided for compensating for the changes in viscosity of the oil due to the varying atmospheric temperature.

I compensate for this deleterious feature by causing the control orifice 23 to vary proportionately to the changes in the viscosity of the oil. The plug 20 shown in Fig. 2, is of a relative fixed size and has substantially no expansion due to changes in temperature. The aluminum piston 12 on the other hand expands and contracts with changes in temperature thus causing the sides of the control orifice 23 to change proportionately to a change in temperature. When the temperature drops the orifice 23 increases in size and when the temperature increases the orifice 23 decreases in size. This means that the size of the control orifice 23 is proportional to the viscosity of the resistance fluid or oil. Thus it will be evident that I have provided a relatively simple device for compensating for changes in the viscosity of the resistance fluid of a shock absorber or controller.

In Fig. 3, I have illustrated a modified form of plug 20' adapted to be used in connection with a piston such as the piston 12. When this type of plug 20' is employed the piston is preferably made of a metal having a relatively low temperature coefficient of expansion. This metal may be invar.

The plug 20' comprises a shank portion 80 having its lower end 81 threaded and provided with a shoulder portion 82. The shoulder portion 82 is adapted to abut the boss 22 of a cap 15 and the threaded portion 81 is adapted to be threaded into the substantially central opening of the shaft. Mounted on the shank 80 is a tubular member or sleeve 83 fastened at its upper end to the top of the shank 80 as indicated at 84. This sleeve 83 is preferably made of a material having a relatively high temperature coefficient of expansion such for example as aluminum. Surrounding the sleeve 83 is a tapered tubular member 85 preferably made of invar and fastened at its lower end 86 to the lower end of the sleeve 83.

In use the plug 20′ functions to vary the size of an opening such for example as the opening 23 in the piston 12. As the temperature of the ambient or atmosphere increases the sleeve 83 expands downwardly drawing the tubular member 85 with it. Due to the fact that the member 85 is tapered it will be evident that by drawing it downwardly in the opening it will decrease the size of the orifice afforded by the opening. When the sleeve 83 contracts with a drop in temperature it moves upwardly drawing with it the tubular member 85 thus resulting in the size of the control orifice being increased.

In Fig. 4, I have illustrated another type of plug 20″ adapted to expand and contract to vary the size of a control orifice such as the control orifice 23 shown in Fig. 2. This construction differs from that shown in Fig. 3 in that the expansion of the plug is radial rather than longitudinal. The plug comprises a shank member 90 having its lower end threaded at 91. The upper end 92 of the shank is reduced in size to form a shoulder 93 against which the lower end of a tapered sleeve 95 abuts. The sleeve 95 is preferably conical in construction and tapers downwardly toward the shoulder 93. The upper end of the reduced portion 92 extends through an opening 96 in the top of the sleeve 95 and has a nut 97 threaded on its external end. This nut 97 serves to firmly clamp the sleeve 95 against the shoulder 93 of shank 90. The purpose of this clamped construction is to prevent longitudinal expansion of the sleeve 95 thus resulting in the sleeve having to expand laterally or radially. The sleeve 95 is preferaby made of aluminum or any other suitable material having a relatively high temperature coefficient of expansion and the shank 90 including its reduced portion 92 is preferably made of a substance having a relatively low temperature coefficient of expansion such for example as the invar or cast-iron. Of course it will be evident that as the sleeve 95 expands and contracts radially it results in the size of the associated control orifice being varied.

Now I desire it understood that although I have illustrated and described in detail the preferred forms of my invention the invention is not to be thus limited but only in so far as defined by the scope and spirit of the appended claims.

I claim:

1. In a shock absorber, a container for fluid, means including a movable member having a control orifice associated with said container, and means including a plug member extending into said orifice for co-operating with the orifice in controlling the flow of fluid, one of said members being thermostatically controlled for compensating for changes in the viscosity of the fluid.

2. In a controller for vehicle springs and the like, a housing including a receptacle for a fluid, a piston in said receptacle having a control orifice for controlling the flow of fluid past said piston, a plurality of rollers connected to a portion of said piston, a cam for reciprocating the piston having a peripheral flange disposed between said rollers, a shaft connected to said cam for operating the same, resilient means associated with said shaft having one end connected to the shaft and the other end to said housing, a drum member connected to said shaft for actuating the same, and a flexible strap fastened to said drum for rotating the drum.

3. In a shock absorber, a housing including a receptacle for a working fluid, a piston in the said receptacle having a control orifice adapted to permit the said fluid to flow through the said piston, a check valve connected to the said piston adapted to permit return of the liquid to the cylinder on the outward stroke of the piston, means for actuating the piston, and temperature responsive means mounted on the housing and associated with the said piston for controlling the size of the control orifice.

4. In a shock absorber, a housing including a cylinder adapted to contain a working fluid, a piston reciprocable in the said cylinder, temperature responsive means associated with the said piston for controlling the rate of flow of resistance fluid past the said piston, a follower carried by the said piston, and a cam having a peripheral flange adapted to engage the said follower for the purpose of actuating the piston.

5. In a shock absorber, a cylinder for liquid, a piston for the cylinder, a check-valved bypass about the piston, a second bypass, means controlling the bypass to a degree varying with the position of the piston and having thermostatic adjusting means imposing an additional control upon said second bypass.

6. In a hydraulic shock absorber employing a liquid working medium, a piston member, a cylinder member, means for actuating the piston member relative to the cylinder member, one of said members having a bypass comprising an orifice, and a thermostatically controlled element carried on the cylinder member governing the opening of the said orifice to compensate for changes of viscosity of the liquid working medium under changes of temperature.

In witness whereof, I hereunto subscribe my name this 6th day of May, 1927.

MILTON E. CHANDLER.